No. 700,651. Patented May 20, 1902.
W. D. HUGHES.
NUT LOCK.
(Application filed Oct. 19, 1901.)
(No Model.)

WITNESSES:
H. L. Amer.
John F. Byrne.

INVENTOR
Will D. Hughes.
BY Victor J. Evans
Attorney

United States Patent Office.

WILLIAM D. HUGHES, OF GRANVILLE, NEW YORK, ASSIGNOR OF ONE-HALF TO JOHN T. WILLIAMS, OF BROWNVILLE, MAINE.

NUT-LOCK.

SPECIFICATION forming part of Letters Patent No. 700,651, dated May 20, 1902.

Application filed October 19, 1901. Serial No. 79,287. (No model.)

*To all whom it may concern:*

Be it known that I, WILLIAM D. HUGHES, a subject of the King of Great Britain, residing at Granville, in the county of Washington and State of New York, have invented certain new and useful Improvements in Nut-Locks; and I do hereby declare the following to be a full, clear, and exact description of the invention, such as will enable others skilled in the art to which it appertains to make and use the same.

This invention relates to nut-locks, and has for its object the production of a device of this character which will greatly lessen the cost of constructing railroad-joints by obviating the necessity of providing fish-plates with fastening means for securing the locking-bar thereto and forming the nuts with flanges in order that the locking-bar may prevent their turning.

Further objects of the invention will appear as the nature thereof is more fully understood from the following description.

The invention consists in the novel construction, combination, and arrangement of parts, as will be hereinafter fully described and claimed, and illustrated in the accompanying drawings, in which—

Figure 1:
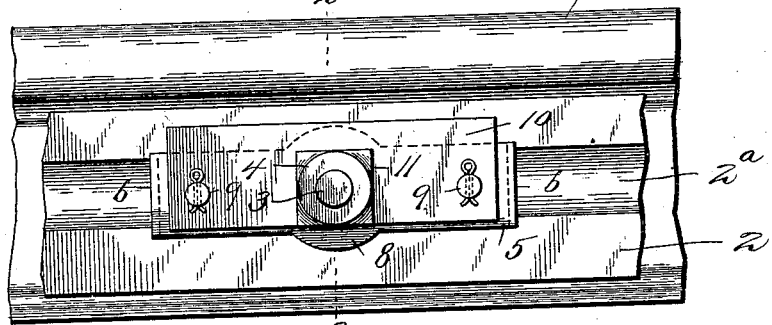
Figure 2:
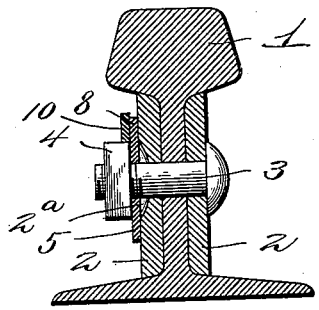
Figure 3:
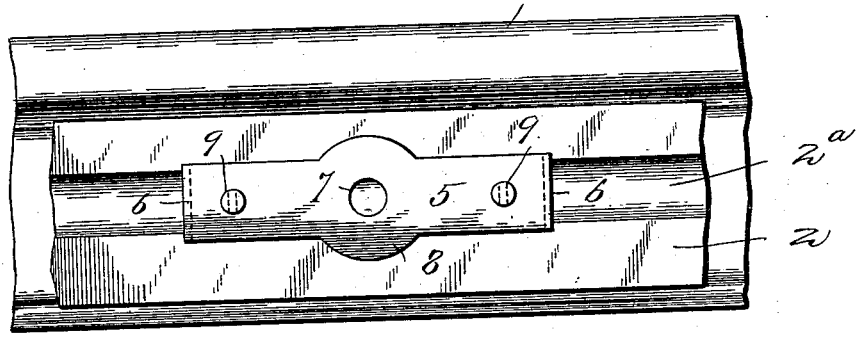
Figure 4:
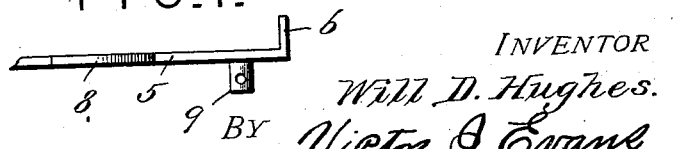

Figure 1 is a side elevation of a portion of a rail and fish-plate, showing my improved nut-lock applied thereto. Fig. 2 is a sectional view on the line 2 2 of Fig. 1. Fig. 3 is a similar view to Fig. 1 with the locking-bar and nut removed. Fig. 4 is a detail plan of one end of the washer.

1 designates a portion of a rail-section broken away at a point near one of its ends, and 2 the fish-plates, one of which is provided with a longitudinal groove $2^a$. The rails and fish-plates are secured together in the usual manner by bolts and nuts, one of which only is shown, 3 designating the bolt and 4 the nut.

5 designates a washer, preferably oblong in form and adapted to be secured between the fish-plate and nut against movement. The washer has its ends bent inwardly at an angle to provide flanges 6 to fit into the grooves $2^a$ and is provided with an opening 7, through which the bolt 3 is adapted to extend, and an enlarged central portion 8, against which the nut 4 bears, evenly distributing the pressure brought to bear upon the washer by the nut to prevent the washer from tilting vertically upon the bolt, and also to hold said flanges in the groove, thereby securing the washer on the bolt against movement. The washer is provided on the face thereof with forwardly-extending lugs 9, upon which is secured the locking-bar 10, and is provided with perforations through which pass suitable fastening devices to secure said bar thereon.

The locking-bar 10 is provided with suitable openings, through which extend the lugs 9, and has a nut-receiving opening 11, which may be of any preferred form, depending upon the form of the nut to be locked.

It is obvious from the above description, taken in connection with the accompanying drawings, that the flanges 7, infitting in the groove $2^a$, will hold the washer, which is mounted upon the bolt 3, against movement, and the bar 10 in locking the nut 4 upon the bolt holds the flanges in the groove, thus obviating any liability of the nut becoming loose. It is further obvious that I greatly reduce the cost of a nut-lock and also obviate the necessity of providing the fish-plate with means for holding a locking-bar and obstructing-nuts with shoulders in order that the locking-bar may prevent their turning.

This nut-lock is not restricted to use upon rails, but may be employed wherever the flanges may secure a grip to hold the washer against movement.

Having described my invention, what I claim is—

The combination with a rail, a bolt carrying a nut, and a fish-plate having a longitudinal groove and secured upon the bolt between the nut and rail, of a washer secured upon the bolt between the fish-plate and nut, the washer having its ends bent at right angles to fit in the groove and provided with an enlarged bearing-surface against which the nut bears preventing the washer from tilting upon the bolt and to hold the flanges in the groove, lugs upon the washer, and a locking-bar having a nut-receiving opening and secured upon the lugs.

In testimony whereof I affix my signature in presence of two witnesses.

WILLIAM D. HUGHES.

Witnesses:
THOMAS J. PARRY,
DAVID D. WILLIAMS.